(12) United States Patent
Wang

(10) Patent No.: US 9,933,015 B2
(45) Date of Patent: Apr. 3, 2018

(54) ROLLING ELEMENT BEARING

(71) Applicant: Jun Wang, Delfgauw (NL)

(72) Inventor: Jun Wang, Delfgauw (NL)

(73) Assignee: AKTIEBOLAGET SKF, Gothenburg (SE)

(*) Notice: Subject to any disclaimer, the term of this patent is extended or adjusted under 35 U.S.C. 154(b) by 8 days.

(21) Appl. No.: 15/131,580

(22) Filed: Apr. 18, 2016

(65) Prior Publication Data
US 2016/0305480 A1 Oct. 20, 2016

(30) Foreign Application Priority Data

Apr. 16, 2015 (GB) .................................... 1506449.6

(51) Int. Cl.
F16C 33/66 (2006.01)
F16C 33/38 (2006.01)
F16C 19/16 (2006.01)
(52) U.S. Cl.
CPC ....... *F16C 33/6681* (2013.01); *F16C 33/3806* (2013.01); *F16C 33/6629* (2013.01); *F16C 19/163* (2013.01); *F16C 33/3856* (2013.01); *F16C 33/6607* (2013.01); *F16C 2300/22* (2013.01)
(58) Field of Classification Search
CPC ........ F16C 19/06; F16C 19/16; F16C 19/163; F16C 33/3856; F16C 33/3875; F16C 33/6614; F16C 33/6629; F16C 33/6651; F16C 33/6681
See application file for complete search history.

(56) References Cited

U.S. PATENT DOCUMENTS

| 2,838,348 | A | * | 6/1958 | Hamm | F16C 33/3843 384/466 |
| 3,450,449 | A | * | 6/1969 | Sibley | F16C 33/6681 384/465 |
| 3,743,369 | A | | 7/1973 | Langstrom | |
| 8,529,135 | B2 | * | 9/2013 | Duffy | F16C 33/6681 384/385 |
| 8,622,622 | B2 | * | 1/2014 | Solfrank | F16C 33/3806 384/462 |

FOREIGN PATENT DOCUMENTS

| EP | 2562437 A2 | 2/2013 |
| JP | H0510827 U * | 2/1993 |
| JP | 2004340268 A | 12/2004 |

* cited by examiner

*Primary Examiner* — Phillip A Johnson
(74) *Attorney, Agent, or Firm* — Bryan Peckjian; SKF USA Inc. Patent Dept.

(57) ABSTRACT

The invention relates to a rolling element bearing having at least one inner bearing inner and at least one outer bearing ring. Rolling elements are arranged between the inner ring and the outer ring, and the rolling elements are guided by a cage. To improve the lubrication of the bearing the invention proposes that the cage includes at least one opening, preferably a bore. The opening penetrates the cage from a radial inner surface to a radial outer surface.

11 Claims, 1 Drawing Sheet

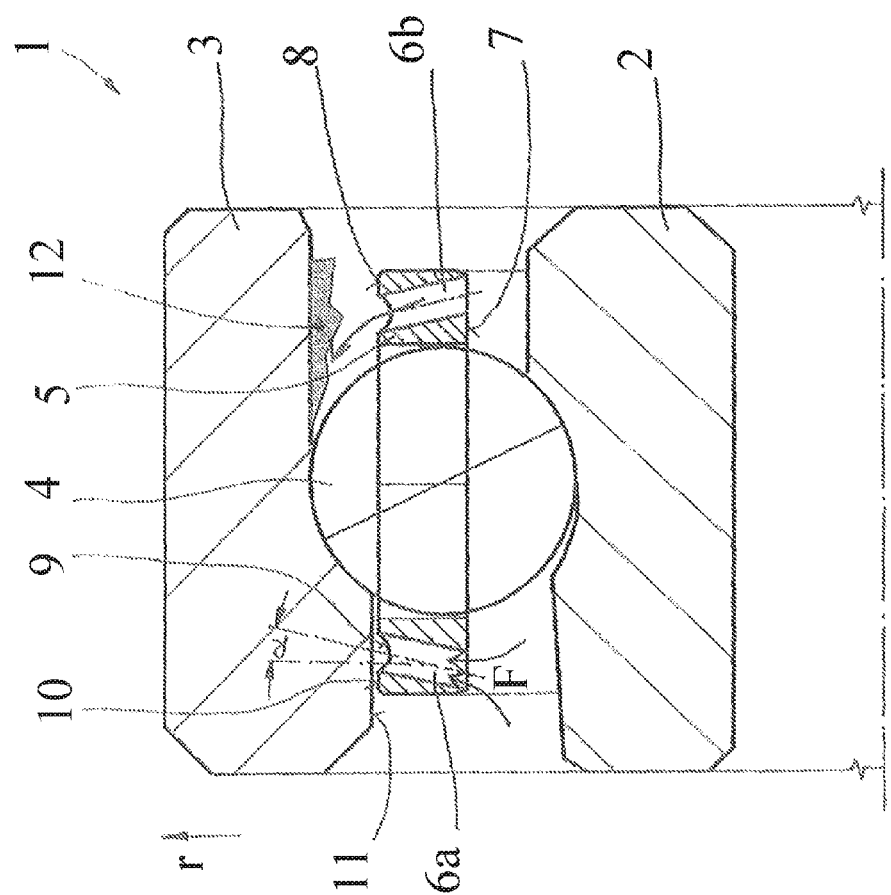

ROLLING ELEMENT BEARING

CROSS-REFERENCE TO RELATED APPLICATIONS

This application claims priority to Great Britain patent application no. 1506449.6 filed on Apr. 16, 2015, the contents of which are fully incorporated herein by reference. Applicant respectfully notes, the one year anniversary of the earliest priority document falls on a non-business day, and therefore, Applicant is afforded through the next business day (Monday, Apr. 18, 2016) to maintain copendency.

TECHNICAL FIELD

The invention relates to a rolling element bearing, comprising at least one inner bearing ring and at least one outer bearing ring, wherein rolling elements are arranged between the inner ring and the outer ring, wherein the rolling elements are guided by a cage, wherein the cage comprises at least one opening, especially a bore, wherein the opening penetrates the cage from a radially inner surface to a radially outer surface.

BACKGROUND

Bearings according to the generic kind are well known in the art. As examples reference is made to JP 2004 340 268 A, to EP 2 562 437 A2 and to U.S. Pat. No. 3,743,369 A. Especially in the case of a high-speed rolling element bearing, a significant amount of heat can be generated in the bearing. Here, cage overheating is mostly the major cause of bearing failure at high speed operations. The cage overheating is often initiated at the cage guiding zone because there exists a small clearance between the cage outer surface and the outer ring guiding surface. Heat is generated at the guiding zone due to sliding friction between the fast rotating cage and the stationary outer ring.

Thus, it is an object of the present invention to further develop a rolling element bearing of the generic kind in such a manner that the lubrication is improved and even at high speed operation the heat generation is reduced in the bearing. Thus, the lifetime of the rolling element bearing should be increased.

SUMMARY OF THE INVENTION

The solution according to the invention is characterized in that the radially outer end of the at least one opening terminates in a groove in the radially outer surface of the cage.

Preferably, a plurality of openings is arranged in the cage. The openings can be arranged equidistantly along the circumference of the cage.

The at least one opening can be arranged in at least an axial end region of the cage. Due to balance reasons it can also be provided that openings are arranged in both axial end regions of the cage.

The at least one opening is preferably a bore and has an axis which extends in radial direction through the cage.

As an alternative it can be provided that the at least one opening is a bore and has an axis which extends under an angle to the radial direction through the cage; the angle is preferably between 5° and 30°. If the holes (bores) are arranged under an angle the lubrication for greased bearings can be further improved (see explanations below).

The at least one opening can be manufactured by means of a drilling process.

The groove can be a ring groove in the radial outer surface of the cage. Furthermore, it can be provided that the groove has an arcuate shape in a radial cross section of the cage; the arcuate shape is preferably an arc of a circle or an arc of an ellipse.

The cage has preferably a sliding surface at the radial outer surface which is designed for a sliding contact with a radial inner sliding surface of the outer bearing ring of the rolling element bearing.

The rolling element bearing can be a ball bearing. Specifically preferred, the ball bearing is an angular contact ball bearing (ACBB).

The cage can be made of plastic material.

Preferably, the bearing is at least partially filled with a lubricant, especially with oil or grease.

Thus, the invention provides a design of the cage with self pumping holes and a damping groove. The radial holes in the cage allow that a fluid pumping flow is introduced by the cage rotation itself. The pumping flow throughout the holes to the guiding surface reduces friction and removes heat generated by the sliding surfaces. So, higher bearing speed is possible due to a high fluid pumping rate.

Mostly, the application is a high speed bearing with an outer ring guided cage. The invention works for both oil and grease lubrication.

Beneficially, the groove on the top of the cage pumping holes allow to hold some oil for better lubrication and cage damping when the cage impacts onto the outer ring guiding shoulder. I.e. the invention thus provides a high speed cage with pumping holes and damping grooves.

Specifically, in addition to the cooling effect to the cage guide surface, the proposed idea with the openings on the other side of the cage, built with an angle to the radial direction, provides an improved lubrication particularly for high speed angular contact ball bearings with grease lubrication.

BRIEF DESCRIPTION OF THE DRAWINGS

The only drawing, FIG. 1 shows an embodiment of the invention. This FIGURE shows a radial cross sectional view through a rolling element bearing with a cage according to the invention.

DETAILED DESCRIPTION OF THE INVENTION

In FIG. 1, a rolling element bearing 1 is shown which is a ball bearing in the present case. The bearing 1 has an inner bearing ring 2 and an outer bearing ring 3. Rolling elements 4 are arranged between the inner ring 2 and the outer ring 3 in a common manner. The rolling elements 4 are guided by a cage 5.

The cage 5 has receiving pockets for the rolling elements 4. In the depicted case, the cage 5 has a radially inner surface 7 and a radially outer surface 8. The radially outer surface 8 is partially designed to be a sliding surface 10 of the cage 5. This sliding surface 10 can slide on a sliding surface 11 of the outer bearing ring 3 to guide the cage 5 relatively to the bearing outer ring 3. That is, the cage 5 is guided on a shoulder of the outer bearing ring 3 with the left axial end region of the cage 5.

To provide low friction at the mentioned sliding contact between the sliding surface 10 of the cage 5 and the sliding surface 11 of the outer ring 3, the cage 5 comprises a number of openings 6a, which are bores in the present case. At the opposite axial side of the cage, a further set of openings 6b may be provided in the cage 5. The openings 6a, 6b penetrate the cage 5 from the radially inner surface 7 to the radially outer surface 8. The openings may have an axis which is directed in the radial direction r. In the present embodiment according to the FIGURE, a solution is provided in which the axis of the openings 6a, 6b is arranged under an angle □ to the radial direction r, so as to extend axially inward in radially outward direction. The angle is preferably between 5° and 30°.

In the present case, the radial bores 6a, 6b are drilled into the cage 5. In the depicted embodiment, the bores 6b on the non-guided (right) side are for the purpose of cage balance; but as explained below, this embodiment has also other advantages.

The fast rotation of the cage 5 generates the centrifugal force that pumps air/oil through the cage holes into the cage guiding zone. This is depicted by the arrows denoted with F (direction of flow).

The fluid pumped by the cage 5 brings heat generated by cage shearing and cage sliding friction away from the guiding zone.

For facilitating this effect, the bores 6a end into a groove 9 which is a ring groove which runs around the whole circumference of the cage 5. Here, lubricant can be collected and forms a certain lubricant cushion between the two sliding surfaces 10 and 11. The bores 6b may also end into a ring grove.

With respect to the effect of the proposed concept the following explanations are given:

The speed of a grease lubricated bearing is limited by the bearing temperature rise, often due to poor lubrication. At high speed operation, for example speed higher than 10E6 for the product (n×dm) (n is the bearing rotational speed in rpm and dm is the bearing pitch diameter in mm), the speed of the bearing is high so that the grease on the inner raceway and the cage 5 is thrown off quickly by the centrifugal force. Even on the outer raceway where some grease may be available for some time, the time interval for contact replenishment is too short at high speed operation. To improve grease lubrication for high speed bearing, it is desired to enhance the lubricant replenishment on the raceways.

The openings 6b on the cage 5 improve bearing lubrication at high speed condition. Some of the grease after initial churning-in and thrown-off by the centrifugal force is located on the outer ring shoulder, forming a grease reservoir 12.

The openings 6b of the cage 5, built under the angle α, generate a flow by the centrifugal force when the cage 5 rotates at high speed. The generated flow pushes part of the grease on the reservoir 12 closer to the rolling elements and raceway. So the bled oil from the grease reservoir 12 takes a shorter time to reflow to the contacts.

In addition, when the flow passes through the surface of the grease reservoir 12, the bled oil from the reservoir and even a layer of grease on the reservoir surface will be sheared off and brought back to the rolling element and the outer raceway by the flow.

So, the lubrication can be improved significantly.

REFERENCE NUMERALS

1 Rolling element bearing
2 Inner bearing ring
3 Outer bearing ring
4 Rolling elements
5 Cage
6a, 6b Radial opening (bore)
7 Radially inner surface of cage
8 Radially outer surface of cage
9 Groove
10 Sliding surface of the cage
11 Sliding surface of the outer bearing ring
12 Grease reservoir
r Radial direction
F Direction of flow
α Angle

The invention claimed is:

1. A rolling element bearing comprising:
an inner bearing ring,
an outer bearing ring,
a cage located between the inner bearing ring and the outer bearing ring, the cage having a radially inner surface, a radially outer surface, and a plurality of pockets therein
a plurality of rolling elements are arranged between the inner bearing ring and the outer bearing ring, the plurality of rolling elements are located in the plurality of pockets of the cage and are guided thereby,
wherein in addition to the plurality of pockets the cage further defines a plurality of openings each penetrating the cage from the radially inner surface to the radially outer surface to terminate in a groove in the radially outer surface of the cage, the plurality of openings are located in both axial end regions of the cage such that each of the plurality of openings is a bore having an axis that extends linearly from the radially inner surface to the radially outer surface, the axis extends at an angle relative to the radial direction through the cage, the angle is between five degrees (5°) and thirty degrees (30°).

2. The rolling element bearing according to claim 1, wherein the openings are arranged equidistantly along the circumference of the cage.

3. The rolling element bearing according to claim 1, wherein the at least one opening is arranged in at least one axial end region of the cage.

4. The rolling element bearing according to claim 1, wherein the at least one opening is a bore and has an axis which extends in radial direction (r) through the cage.

5. The rolling element bearing according to claim 1, wherein the at least one opening is manufactured by a drilling process.

6. The rolling element bearing according to claim 1, wherein the groove is a ring groove in the radially outer surface of the cage.

7. The rolling element bearing according to claim 1, wherein the groove has an arcuate shape in a radial cross section of the cage, and wherein the arcuate shape is one of an arc of a circle and an arc of an ellipse.

8. The rolling element bearing according to claim 1, wherein the cage provides a sliding surface at the radial outer surface that is designed for a sliding contact with a radial inner sliding surface of the outer bearing ring of the rolling element bearing.

9. The rolling element bearing according to claim 1, wherein the rolling element bearing is a ball bearing.

10. The rolling element bearing according to claim 1, wherein the cage is made of a plastic material.

11. The rolling element bearing according to claim 1, further comprising being at least partially filled with a lubricant comprising at least one of an oil and a grease.

\* \* \* \* \*